United States Patent Office 3,739,047
Patented June 12, 1973

3,739,047
REMOVAL OF ORTHOPHOSPHORIC ACID FROM ORGANIC PHOSPHATE ESTERS
James R. Stanford, Sugar Land, and Paul G. Vogelsang, Jr., Houston, Tex., assignors to Nalco Chemical Company, Chicago, Ill.
No Drawing. Filed May 3, 1971, Ser. No. 139,824
Int. Cl. C07f 9/02
U.S. Cl. 260—990                                     4 Claims

ABSTRACT OF THE DISCLOSURE

Orthophosphoric acid is removed from organic phosphate esters by extraction with a polar solvent which is a non-solvent for the organic phosphate esters.

BACKGROUND

It is known in the art to prepare organic phosphate esters by reacting polyphosphoric acid or phosphorous pentoxide or mixtures thereof with hydroxy hydrocarbons and/or hydroxyamines as disclosed, for example, in U.S. Pats. 3,462,365, 3,477,956, 3,502,587 and 3,557,001. The resultant compositions are especially useful as scale inhibitors when added to water containing hardness components such as, for example, barium sulfate, calcium sulfate and calcium carbonate. While these organic phosphate esters are effective scale inhibitors when added to scale forming waters, in hardness-ion-precipitation-preventing quantities of the order of 0.5 to 100 parts per million (p.p.m.) of the active effective compound their effectiveness is reduced in certain calcium-containing waters due to the fact that orthophosphoric acid is formed as one of the byproducts during the organic phosphate reaction and its presence reduces the overall effectiveness due to its reaction with calcium to form calcium orthophosphate, thereby producing a scale rather than preventing scale formation.

Accordingly, it would be desirable to provide organic phosphate ester scale inhibitors of the type described in which the amount of orthophosphoric acid present is reduced to a minimum.

OBJECTS

One of the objects of the present invention is to provide new and useful organic phosphate ester scale inhibitors of the type described in which the amount of orthophosphoric acid present therein is reduced to a minimum so that the effectiveness of the resultant product as a scale inhibitor in water containing hardness components is enhanced.

Another object of the invention is to provide a new and improved method for removing orthophosphoric acid from organic phosphate ester compositions of the type described.

Still a further object of the invention is to provide a method of removing orthophosphoric acid from organic phosphate ester compositions of the type described by a process in which the orthophosphoric acid is extracted by a polar solvent in which orthophosphoric acid is soluble but which is not a solvent for the organic phosphate ester.

A more specific object of the invention is to provide a process for separating and recovering orthophosphoric acid from an organic phosphate ester reaction product derived by the reaction of polyphosphoric acid and/or phosphorous pentoxide with polyhydroxy compounds such as polyhydroxy hydrocarbons and/or hydroxyamines and re-utilizing the orthophosphoric acid. Other objects will appear hereinafter.

BRIEF SUMMARY OF THE INVENTION

In accordance with the invention a reaction product comprising organic phosphate esters obtained by reacting a polyhydroxy compound from the group consisting of hydroxy hydrocarbons and/or hydroxyamines with polyphosphoric acid/or phosphorous pentoxide, and which contains phosphorus in the form of orthophosphoric acid, is extracted with a polar solvent in which orthophosphoric acid dissolves but which is a non-solvent for the organic phosphate esters in the reaction product, in sufficient amount to reduce the quantity of orthophosphoric acid to a minimum, preferably below 4% by weight, so that the residual product comprises a relatively greater amount of an organic phosphate ester in which the phosphate ester groups consisting essentially of one or both of a member selected from the group consisting of

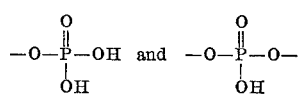

DETAILED DESCRIPTION OF THE INVENTION

Methods of preparing organic phosphate esters by the reaction of polyphosphoric acid and/or phosphorous pentoxide and polyhydroxy compounds are fully described in U.S. Pats. 3,462,365, 3,477,956, 3,502,587, 3,557,001, U.S. applications Ser. Nos. 680,028 filed Nov. 2, 1967, 682,618 filed Nov. 13, 1967, and 8,437 filed Feb. 3, 1970.

The term "polyphosphoric acid" is defined in the Merck Index, 8th Edition, and a typical analysis is 83% $P_2O_5$, which is an orthophosphoric acid equivalent of 115%. Commercially this material is known as "115% polyphosphoric acid." However, the organic phosphate esters can be made with phosphorous pentoxide or with a mixture of polyphosphoric acid and phosphorous pentoxide in various proportions. Examples of polyhydroxy compounds which can be employed in making the organic phosphate esters are: oxyethylated glycerine containing 1.5 to 2.5 moles of ethylene oxide per mole of glycerine; oxyethylated mannitol made with 2 to 20 moles of ethylene oxide per mole of mannitol; oxyethylated sorbitol made by reacting 2 to 20 moles of ethylene oxide per mole of sorbitol; oxyethylated trimethylolpropane made with 1.5 to 2.5 moles of ethylene oxide per mole of trimethylolpropane; hydroxy hydrocarbons made by reacting other alkylene oxides, e.g., 1,2-propylene oxide and/or 1,2-propylene oxide or mixtures of these with ethylene oxide, or sequential additions of 1,2-propylene oxide and ethylene oxide in that order with polyhydroxy hydrocarbons.

The polyphosphoric acid and/or phosphorous pentoxide can also be reacted with hydroxyamines in which the hydroxyl groups of the amine are separated from a nitrogen atom of the amine by at least one carbon atom as, for example, triethanolamine, aminoethylethanolamine, diethanolamine, and oxyalkylated amines made by adding ethylene oxide, 1,2-propylene oxide, and/or 1,2-butylene oxide to amines containing reactive hydrogen atoms such as ethylenediamine, diethylene triamine, triethylene tetramine, tetraethylenepentamine, and amine residues obtained as by-products in the production of polyalkylenepolyamines and alkanolamines. Other amines which can be oxyalkylated are dipropylenetriamine, propylenediamine, and the like. In general, the amines will contain two or more hydroxy groups, 1 to 10 nitrogen atoms and in the case of polyamines, the nitrogen atoms will be separated by alkylene groups containing 2 to 6 carbon atoms.

The organic phosphate esters can also be derived from mixtures of hydroxy hydrocarbons and hydroxyamines and they can be mixtures of esters or mixed esters.

Ordinarily, the organic phosphate esters obtained by the reaction of polyphosphoric acid and/or phosphorous pentoxide with a polyhydroxy compound are dissolved in water and used in the form of aqueous solutions. Alcohols, such as methanol or ethanol, or liquid polyols such as ethylene glycol are added to these solutions in order to prevent freezing.

In the practice of the present invention the preferred procedure is to extract the reaction product containing the organic phosphate ester and orthophosphoric acid at least once but preferably two or more times with a polar solvent, for example, isopropyl alcohol, ehanol, Cellosolve acetate, isobutanol, or tetrahydrofuran, in which the orthophosphoric acid is soluble but the residual organic phosphate ester is immiscible. Water can also be present and will dissolve the organic phosphate ester and does not interfere with the extraction but a minor amount is usually employed as compared with the isopropanol or other organic extractant. The extractant is separated from the organic phosphate ester phase and orthophosphoric acid recovered therefrom.

The orthophosphoric acid can then be sold separately and used as such, for example, in making phosphorus-containing fertilizers or as an ingredient of other compositions. Phosphorous pentoxide can be added to the recovered orthophosphoric acid to produce polyphosphoric acid which can be re-utilized by reacting it with a polyhydroxy organic compound to produce more organic phosphate esters of the type described. At the same time, the effectiveness of the organic phosphate ester composition as a scale inhibitor and inhibiting scale formation by hardness components in water is enhanced due to the removal of the orthophosphoric acid component for the reasons previously explained. Since the organic ester phosphate scale inhibitors that are prepared by the reaction of polyphosphoric acid and polyhydroxy compounds contain anywhere from 10% to 50% orthophosphoric acid which can react with calcium in many waters to form calcium phosphate, the removal of the orthophosphoric acid is a distinct advantage.

The invention will be further illustrated but is not limited by the following examples in which the quantities are given by weight unless otherwise indicated.

EXAMPLE I (a) 3400 parts of 115% polyphosphoric acid was added to a reactor and heated to 50° C. to 60° C. 1000 parts of a hydroxyamine (Amine N-4) was added slowly at a rate sufficient to maintain the temperature between 80° C. and 110° C. The final 20% of the hydroxyamine was added more rapidly and the temperature allowed to rise to 125° C.–130° C. where it was maintained for 30 minutes. The reaction mixture was then cooled.

(b) 1000 parts of the reaction mixture from (a) was agitated with 1000 parts isopropyl alcohol and heated slowly over a one hour period to 84° C., then cooled and allowed to separate. The top layer (isopropyl alcohol extract) comprising 1520.1 parts was removed leaving the bottom layer of 461.6 parts containing the organic phosphate ester. The loss was 18.3 parts.

(c) The bottom layer from (b) was mixed with 500 parts water to complete solution and then agitated with 2000 parts of isopropyl alcohol while heating to 80° C., holding for one hour, then allowing to cool and separate into layers. The top layer contained 2552.7 parts (isopropyl alcohol and water extract) and the bottom layer 381.0 parts (organic phosphate ester). The loss was 27.9 parts. The bottom layer was dissolved in 1000 parts of water.

(d) The extracts from (b) and (c) were combined and heat applied gradually raising the temperature from 82° C. to 125° C. over a period of 4 hours and 40 minutes while distilling the isopropyl alcohol (3191.9 parts) while leaving a residue of orthophosphoric acid, water and some organic phosphate ester (717.2 parts). Total overall loss was 210 parts or 4.7%.

(e) The bottom layer from (c) contained 14.3% organic phosphate ester and only 1.7% orthophosphoric acid whereas the product from (a) contained about 38% orthophosphoric acid and 16% organic phosphate ester when diluted with the same relative amount of water as in (c).

(f) The organic phosphate ester composition obtained from (c) above was tested as a scale inhibitor using the standard test described in U.S. Pat. 3,477,956 for Calcium Carbonate Inhibition and was found to be fully effective at a concentration of 3 p.p.m.

EXAMPLE II

The procedure was the same as in Example I except that phosphorous pentoxide was added to the orthophosphoric acid from (d) in a ratio of 495 parts $P_2O_5$ to 392 parts of said residue to make a reconstituted polyphosphoric acid which was then reacted in relative proportions of 340 parts to 100 parts with the hydroxyamine used in Example I. The extraction procedure was the same as that described in paragraphs (b), (c) and (d) of Example I using 500 parts of isopropyl alcohol and 35 parts water in the first extraction, and 1080 parts isopropyl alcohol and 270 parts water in the second extraction. The isopropyl alcohol was then recovered by distillation in the manner previously described in Example I and re-utilized for further extractions. The orthophosphoric acid residue containing water was reconstituted with $P_2O_5$ and used again in making a subsequent batch of organic phosphate ester inhibitor.

The products obtained by carrying out the process in this manner contained relatively high percentages of organic phosphate esters and were significantly more effective as scale inhibitors than the organic phosphate ester produced in Example I.

It seemed apparent that some organic phosphate ester was being extracted and was present in the orthophosphoric acid residue. Hence, when this residue was reconstituted with $P_2O_5$ and re-utilized in the process the relative proportion of organic phosphate ester in subsequent batches was increased.

The same general procedure can be employed to remove orthophosphoric acid from any of the other organic phosphate ester compositions previously described which contain substantial quantities of orthophosphoric acid, thereby enhancing the effectiveness of these compositions for certain uses and at the same time producing the by-product orthophosphoric acid which can be sold and used for other purposes or re-utilized in the process in the manner described.

It will be understood that in describing the extractant as a "non-solvent" for the organic phosphate esters, the term "non-solvent" is used in a practical sense because small amounts of organic phosphate esters can be dissolved, especially when the extractant contains water. In any event, however, the extractant must have a preferential solvent action for orthophosphoric acid over the organic phosphate esters and the solvent preference is usually at least 10:1.

In the examples, Amine N-4 is a triethanolamine still residue similar to Amine N-1 disclosed in U.S. Pat. No. 3,477,956.

The invention is hereby claimed as follows:

1. In the preparation of organic phosphate esters by the reaction of polyhydroxy organic compounds with polyphosphoric acid, phosphorous pentoxide, or mixtures thereof, wherein orthophosphoric acid is also formed, the improvement which comprises extracting orthophosphoric acid from the resultant product with a solvent which has a preferential solvent action for orthophosphoric acid over said organic phosphate esters thereby removing the orthophosphoric acid from said composition, said solvent being from the group consisting of isopropyl alcohol, ethanol, cellosolve acetate, isobutanol, and tetrahydrofuran.

2. A process as claimed in claim 1 in which said solvent is isopropyl alcohol.

3. A process as claimed in claim 1 in which said solvent is recovered from the extract and re-utilized in subsequent extractions of said organic phosphate esters.

4. A process as claimed in claim 1 in which said solvent is distilled from the extract and the residue containing principally orthophosphoric acid and some organic phosphate esters is mixed with phosphorous pentoxide to produce a reconstituted polyphosphoric acid.

References Cited

UNITED STATES PATENTS

| 3,439,067 | 4/1969 | Austin et al. | 260—978 X |
|---|---|---|---|
| 2,854,468 | 9/1958 | May | 260—990 |
| 2,658,909 | 11/1953 | Crandall et al. | 260—990 |

JOSEPH P. BRUST, Primary Examiner

U.S. Cl. X.R.

260—978, 980; 423—316